(12) United States Patent
Hrazdera

(10) Patent No.: US 6,517,465 B2
(45) Date of Patent: Feb. 11, 2003

(54) METHOD FOR CONTROLLING THE DRIVE MECHANISM OF A VEHICLE

(75) Inventor: Oliver Hrazdera, Enns (AT)

(73) Assignee: Case, LLC, Racine, WI (US)

( * ) Notice: Subject to any disclaimer, the term of this patent is extended or adjusted under 35 U.S.C. 154(b) by 40 days.

(21) Appl. No.: 09/814,503

(22) Filed: Mar. 22, 2001

(65) Prior Publication Data

US 2001/0036882 A1 Nov. 1, 2001

(30) Foreign Application Priority Data

Apr. 20, 2000 (AT) .................................. 307-2000 U

(51) Int. Cl.⁷ .............................................. B60K 41/02
(52) U.S. Cl. ....................................... 477/174; 477/180
(58) Field of Search ................................. 477/166, 174, 477/180, 181; 180/53.1, 53.6

(56) References Cited

U.S. PATENT DOCUMENTS 5,562,173 A * 10/1996 Olson ........................ 180/53.1
6,080,081 A * 6/2000 Sauermann et al. ........ 180/53.1
6,297,566 B1 * 10/2001 Lahr et al. .................. 180/53.6

* cited by examiner

Primary Examiner—Jack Lavinder
Assistant Examiner—C. T. Bartz
(74) Attorney, Agent, or Firm—Rebecca L. Henkel

(57) ABSTRACT

A method for controlling the drive mechanism of a utility vehicle having a power take-off shaft, where the drive mechanism including an engine, a transmission, a power take-off shaft clutch and a controller, operates the drive mechanism in a careful and economical manner. The method of controlling the engine includes the step of issuing an instruction for engaging the power take-off shaft clutch at a low rotational speed of the engine so that the power take-off shaft clutch is engaged in a controlled manner. If the rotational speed of the engine is above a threshold, the rotational speed is automatically reduced before the engaging the power take-off shaft clutch. After fully engaging the power take-off shaft clutch, the rotational speed of the engine is automatically increased until reaching of the rotational speed of the engine required for the nominal rotational speed of the power take-off shaft. When disengaging the power take-off shaft clutch, the controller automatically reduces the rotational speed of the engine.

6 Claims, 3 Drawing Sheets

METHOD FOR CONTROLLING THE DRIVE MECHANISM OF A VEHICLE

FIELD OF INVENTION

This invention relates generally to a method for controlling the drive mechanism of a utility vehicle having a power take-off shaft, and, more particularly, to a controller for the driving mechanism of tractors, self-propelled agricultural machines, municipal utility machines, and self-propelled construction machinery.

BACKGROUND OF THE INVENTION

In use as a utility machine wherein the implement pulled or mounted by means of a power lift device is driven by the power take-off shaft (PTO), the engine speed has to be adjusted such that the required power is available at the take-off-shaft and that the take-off shaft rotates with the appropriate rotational speed ("standard rotational speed") or a rotational speed as close as possible thereto. Conventionally, the engine speed, and thereby also the rotational speed of the take-off shaft, taking into account the gear used in the PTO gear box, is adjusted by means of a hand throttle lever.

In operation, the rotational speed of the power take-off shaft shall not vary to a larger extent since for instance with implements for applying seed or fertilizer, the application density has to be kept constant. On disengaging the power take-off shaft clutch, the rotational speed of the engine stays increased or increases, respectively, unless there is no counter action by the operator, for instance by moving back of the manual throttle lever. This is true for vehicles both with discontinuously or continuously variable transmissions.

A driving mechanism as set out above is known from German Patent Document DE 4.001.398. With this drive mechanism, there is a controlling connection between the engine and the power take-off shaft clutch in that the clutch is disengaged if the rotational speed of the engine decreases too far or if the associated hydraulic power lift device reaches a certain height. When the end of a furrow is reached during field work and the power take-off shaft clutch is disengaged, the manual throttle lever has to be moved back to avoid annoying noises and high fuel consumption; with vehicles having a discontinuously variable transmission, this is additionally required to reduce the traveling speed for a turning maneuver. The automatic disengagement of the power take-off shaft clutch on lifting the power lift device is known and possibly critical with respect to operational safety. Even this cannot prevent that the rotational speed of the engine is reduced or is reduced too late. This results in the fact that the universally jointed shaft connected to the power take-off shaft rotates with high speed in the lifted position with grossly angle universal joints. This increases the wear thereof and can result in the destruction thereof on fast lift-up, especially in view of the fact that with a constant pressure pump and high rotational speed of the engine the lift speed may be quite high. SUMMARY OF THE INVENTION It is an object of the invention to avoid this disadvantages of the prior art by providing a drive controller that effects a careful and economical operation of a vehicle.

It is a feature of this invention that the drive controller issues an instruction for engaging the power take-off shaft clutch at a low rotational speed of the engine, the power take-off shaft clutch is engaged in a controlled manner, or the rotational speed of the engine is automatically reduced before engaging the power take-off shaft clutch, respectively.

It is another feature of this invention that with the full engagement of the power take-off shaft clutch, the rotational speed of the engine is automatically increased by the controller up to the rotational speed of the engine required for the nominal speed of the power take-off shaft.

It is still another feature of this invention that on disengaging the power take-off shaft clutch again, the controller automatically reduces the rotational speed of the engine.

It is an advantage of this invention that the power take-off shaft clutch may be engaged with very little wear and without much load for the driven implement ("soft start up"). The reduced speed of rotation of the engine is just high enough to avoid stalling of the engine on starting up the implement with a corresponding temporally controlled engagement of the power take-off shaft clutch. If the rotational speed of the engine is high at the time of issuing the command, it is reduced beforehand.

It is another advantage of this invention that the rotational speed of the engine and thereby the speed of the power take-off shaft is automatically increased to the correct value which per se results in facilitating the operation. This will take place without any frictional losses within the power take-off shaft clutch. The increase of the rotational speed of the engine further may be optimized by predetermining a temporal function (claim 9). With a discontinuously variable transmission, in this manner further the correct travelling speed is adjusted; with a continuously variable transmission, the operator may direct his full attention to the adjustment of the correct travelling speed.

It is still another advantage of this invention that the rotational speed of the engine is automatically reduced on disengaging the power take-off shaft clutch. In this manner, it is ensured that this reduction occurs, and that it occurs in due time and in the required amount. On the other hand, the slowing-down time of the take-off shaft is shortened and the risk of damages is reduced. The automatic reduction of the engine speed results in a reduction of noise emission and fuel consumption.

With a preferred embodiment, on issuing the instruction to disengage the power take-off shaft clutch, first the rotational speed of the engine is automatically reduced, and only then the power take-off shaft clutch is disengaged. The slowing-down time of the power take-off shaft is even shorter, thereby increasing the longevity and reliability. With a vehicle having a discontinuously variable transmission in the travelling drive transmission, the desired speed reduction also is obtained in due time before turning at the headlands.

If the utility vehicle has a power lift device for an implement driven by the power take-off shaft, an advantageous embodiment of the invention consists in the fact that in an automatic mode of the control, on issuing the instruction for lifting the power lift device, the power take-off shaft clutch is disengaged and the rotational speed of the engine is reduced, and on lowering again of the lift device. In this matter, firstly the convenience of the operation is increased since with only one instruction a plurality of control actions is initiated. In view of the lower rotational speed of the engine and therefore of the oil pump feeding the power lift device, the lift-up of the power lift device is performed in a slower manner. Since the lift-up speed is not controllable with conventional power lift device controllers, this is an twofold advantage.

An even more advantageous embodiment is constituted by the fact, that in an automatic mode of control, on issuing of the instruction to lift up the power lift device, as a first step the rotational speed of the engine is automatically reduced, whereupon the power take-off shaft clutch is disengaged, and only then the power lift device is lifted up, and that on lowering again of the power lift device. In addition to the advantages of the preceding paragraph, this results in the fact that on lifting the power lift device, the rotational speed of the power take-off shaft already shall have been reduced so far that there is no risk of damaging the universally jointed shaft on lifting up. The slowing-down time is even shorter in view of the preceding reduction of the rotational speed.

If the transmission is a transmission having a continuously variable transmission ratio, an additional advantage is obtained by the fact that on operation with engaged power take-off shaft clutch, the rotational speed of the engine is kept constant and the travelling speed is only controlled by the transmission ratio of the transmission. In this manner, with a constant rotational speed of the power take-off shaft, the travelling speed may be adapted to the requirements.

It is further within the scope of the invention to automatically increase the rotational speed of the engine on putting into operation of a further hydraulic load and to decrease this speed on putting out of operation of this load. By this means, the idle speed may be lowered and/or if the further load shall be operational in idle condition, the oil pump driven by the engine may have smaller dimensions. This results from the fact that on increasing the load, the rotational speed of the engine is increased.

In an advantageous embodiment wherein the hydraulic load is fed by a constant pump driven by the engine, a pressure sensor provided at the pump will issue the signal for increasing the rotational speed of the engine. In this manner, short and simple instruction paths will be obtained since the pump is mounted to the engine.

In an embodiment of the invention for a utility vehicle wherein the hydraulic load is connected to a bus system of the vehicle and is fed by a constant pump driven by the engine, said load reports its requirements via the bus system and initiates the increase of the rotational speed of the engine in the required amount, and it further reports faults and effects in this manner a reduction of the engine speed. In this manner, the rotational speed is not simply increased to a predetermined value but adapted to the type and the operational condition of the additional load. In this manner, the possibilities of a modern agricultural bus system (landwirtschaftliches Bus-System-LBS) are used to full extent.

These and other objects, features and advantages are accomplished according to the instant invention by providing a method for controlling the drive mechanism of a utility vehicle having a power take-off shaft, where the drive mechanism including an engine, a transmission, a power take-off shaft clutch and a controller, to operate the drive mechanism in a careful and economical manner. The method of controlling the engine includes the step of issuing an instruction for engaging the power take-off shaft clutch at a low rotational speed of the engine so that the power take-off shaft clutch is engaged in a controlled manner. If the rotational speed of the engine is above a threshold, the rotational speed is automatically reduced before the engaging the power take-off shaft clutch. After fully engaging the power take-off shaft clutch, the rotational speed of the engine is automatically increased until reaching of the rotational speed of the engine required for the nominal rotational speed of the power take-off shaft. When disengaging the power take-off shaft clutch, the controller automatically reduces the rotational speed of the engine.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENTS

Figure 1:
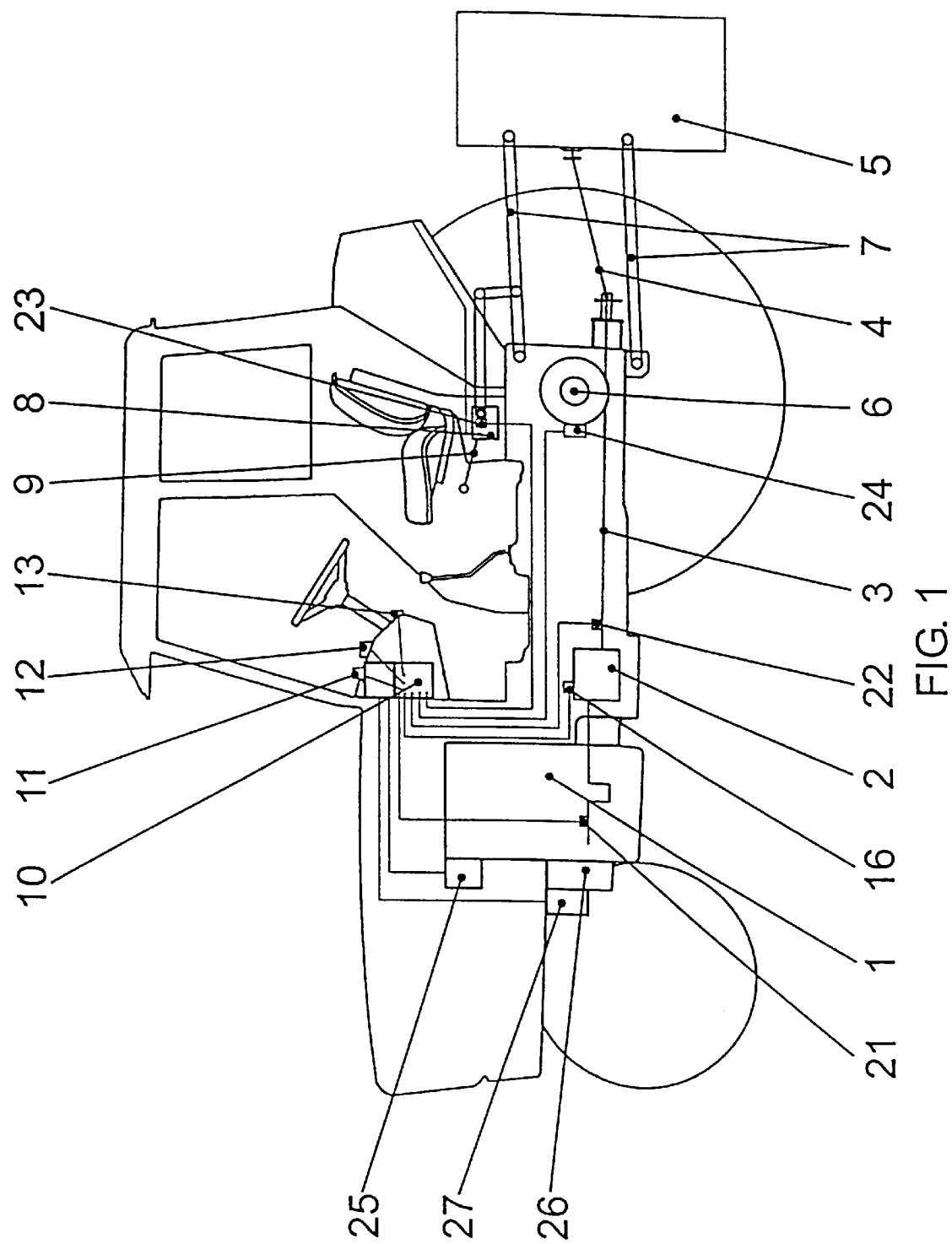
FIG. 1 is a schematic side elevational view of a tractor incorporating the principles of the instant invention.

In FIG. 1, the engine is only schematically shown and designated with 1. The engine is followed by a power take-off shaft clutch 2, possibly followed by a discontinuously variable transmission (not shown) for selecting the power take-off shaft speed (540, 750, 1000 or 1400 RPM). The power take-off shaft clutch 2 is an hydraulically operated clutch of any type, for instance a dry or wet clutch, with one or more disks. From this clutch, a take-off shaft 3 leads to the universally jointed shaft 4 of an implement 5 driven thereby. The rear axle 6 of the tractor is only schematically shown. The tractor further has a power lift device 7 moved by a power lift device hydraulic 8 which is controlled by a power lift device lever 9 near the operators seat. With the embodiment shown, the power lift device and the take-off shaft are disposed at the rear side of the tractor, but they also might be disposed at the front of the tractor.

A controller 10 is disposed at a suitable location within the tractor. It includes a processor repeatingly performing the method according to the invention by means of a control program, and it is connected via wires which are only schematically shown to the operating elements and sensor listed below:

a switch 11 for switching-on the power take-off shaft, preferably a momentary contact switch; in the automatic mode, this switch further may act on the power lift device;

a switch 12 for switching-on the automatic mode, preferably with two positions, a switch 13 for switching-off the power take-off shaft, which is also a momentary contact switch; it could be combined with the switch 11, a switching valve 16 for the power take-off shaft clutch, this is a pulse width modulated on/of valve, a sensor 21 for the engine speed, a sensor 22 for the rotational speed of the power take-off shaft, a sensor 23 for the position of the power lift device, and a sensor 24 for the rotational speed of the rear axle or the travelling speed of the tractor, respectively, a pressure sensor 27 reporting an additional power requirement to the controller 10.

A regulator 25 controls the rotational speed of the engine; it is connected to the controller 10 as regards the action thereof. A constant pump 26 for further hydraulic loads not shown is further disposed at the engine 1, said constant pump 26 having a pressure sensor 27. This pressure sensor reports the switching-on of the further hydraulic load fed by the constant pump 26. This hydraulic load must not necessarily be disposed at the vehicle itself; it further may be the implement or a further additional device. Such a supplemental system which is not on-board of the vehicle, might be connected via a signal connector to the bus system of the vehicle.

Figure 2:
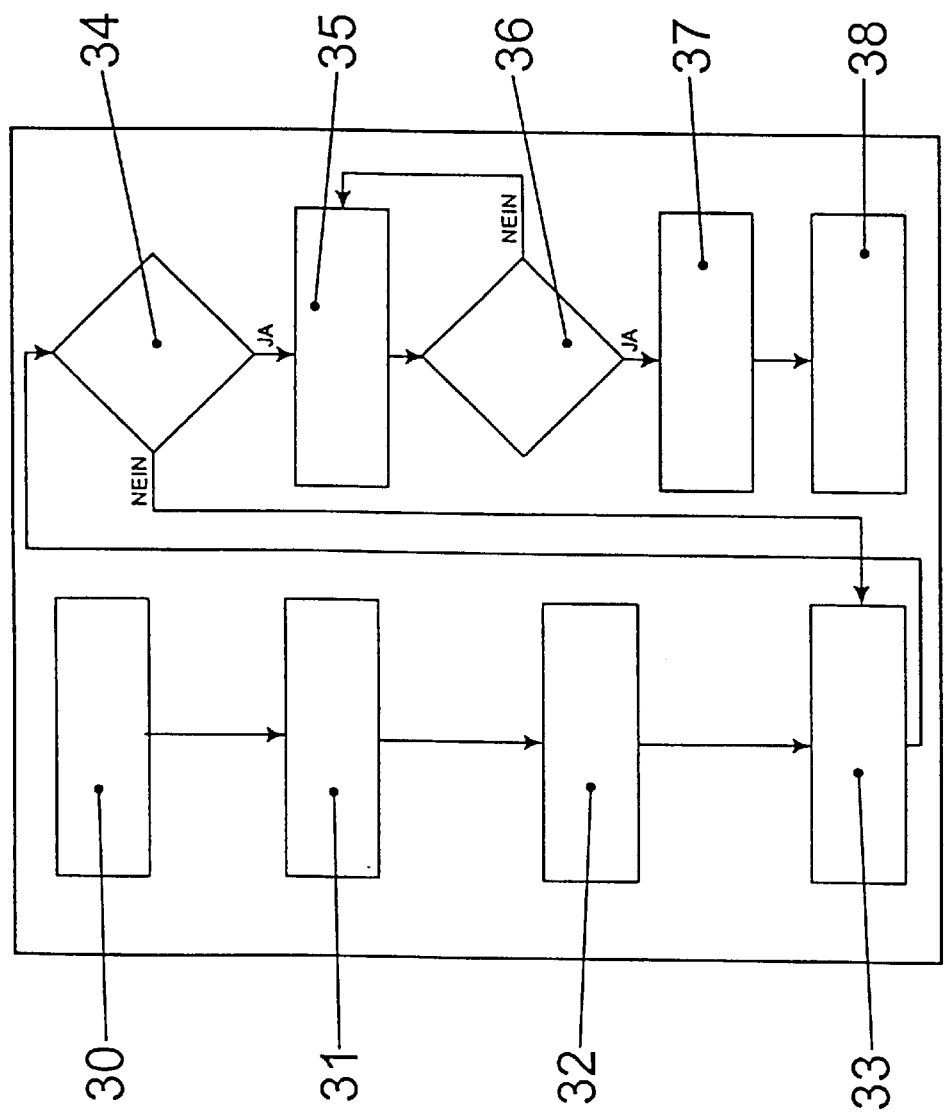
FIG. 2 is a logic flow diagram of the switching-on procedure in a normal mode.

The switching-on procedure according to FIG. 2 starts in the box 30, the engine of the vehicle is running, the power take-off shaft clutch is disengaged, and the vehicle may be in motion or also may be stationary. The operator now issues the instruction for engaging the power take-off shaft clutch by pressing the momentary contact switch 11 (FIG. 1) (box 31). The controller 10 recognizes this instruction and provides a command to the regulator 25 for that nominal speed at which the torque of the engine is sufficient to start-up the power take-off shaft and its implement against the holding torque thereof and to accelerate it. The regulator 25 adjusts this rotational speed (box 32). This rotational speed is as low as possible and just sufficient. In the practice, this means that the rotational speed is slightly increased relative to the idle speed, or, if the vehicle is in motion, the rotational speed of the engine is reduced. On the sensor 21 reporting to the controller 10 that this motor speed has been reached, the controller 10 effects, via the switching valve 16, a controlled engagement of the power take-off shaft clutch. This controlled engagement may be effected after a predetermined function or in response to operating parameters (box 33). This controlled start-up is symbolized by the decision rhombus 34. As soon as the power take-off shaft clutch 2 is engaged, for instance if the controller 10 detects that the power take-off shaft speed (sensor 22) and the engine speed (sensor 21) are equal, the controller issues the instruction to the motor regulator 25 to increase the engine speed.

This increase of the engine speed is again performed stepwise (decision rhombus 36) up to the time at which the motor speed required for the standard speed of the power take-off shaft is reached (box 35). This increase of the rotational speed also may take place according to a predetermined function. If, in the decision rhombus, it is detected i36 that this rotational speed is reached, the start-up procedure is completed (box 37). In most cases, the operator only by now will start moving the vehicle (box 38). On the other hand, the start of the movement may take place earlier or the complete start-up procedure may take place during the motion of the vehicle. In this case, the use of a continuously variable transmission is of special advantage.

Figure 3:
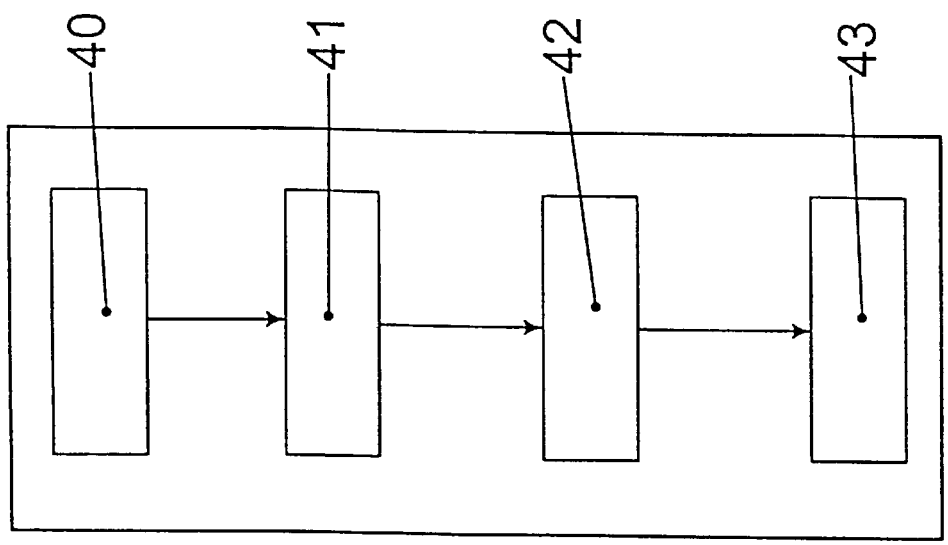
FIG. 3 is a logic flow diagram of the switching-off procedure in a normal mode.

The switching-off procedure of FIG. 3 starts in the condition at which we left FIG. 2. The engine rotates with the rotational speed required for the standard speed of the power take-off shaft (box 40). If the operator issues the instruction for disengagement of the power take-off shaft clutch by actuating the momentary contact switch 13 (box 41), the controller 10 will cause the disengagement of the power take-off shaft clutch 2 (box 42) and will reduce the rotational speed of the engine, preferably down to the idle speed, by acting upon the regulator 25 (box 43). Depending on the requirements and conditions, the boxes 42, 43 may be traversed in reverse order or may traversed concurrently.

Figure 4:
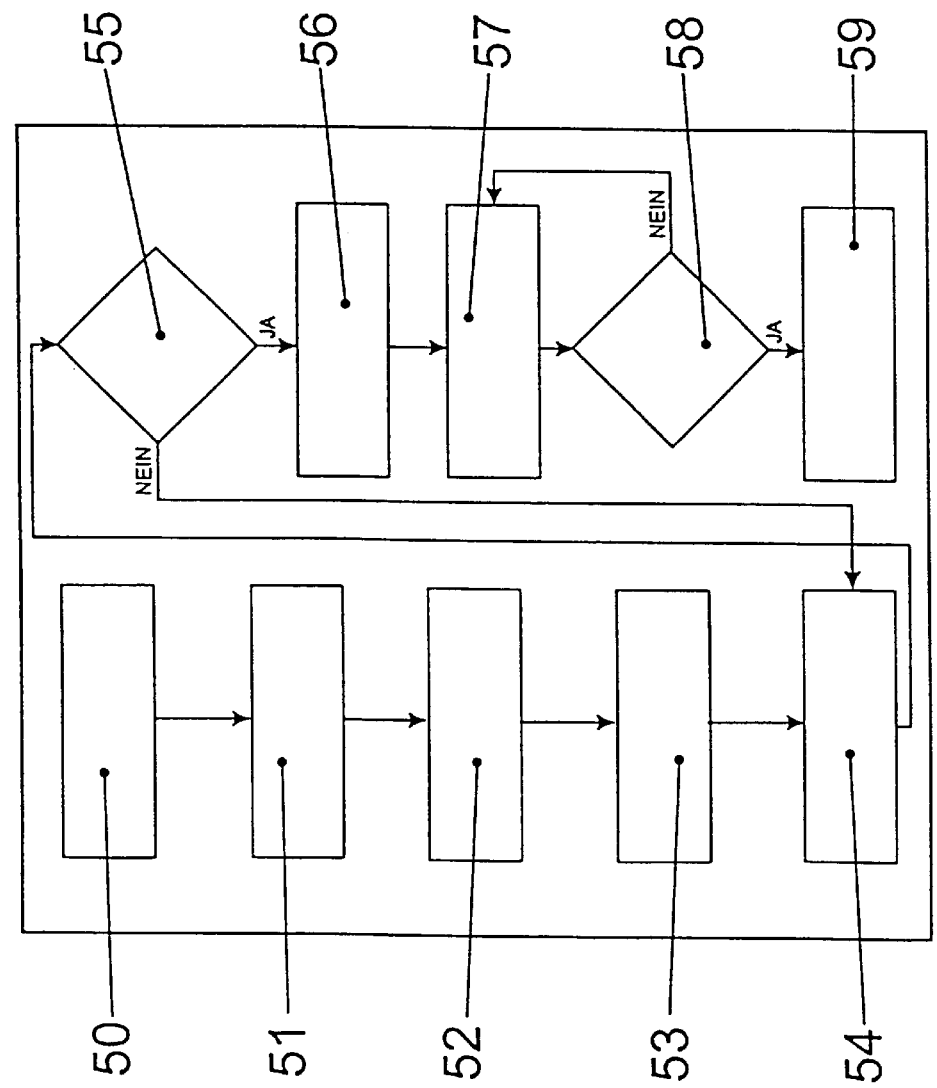
FIG. 4 is a logic flow diagram of the switching-on procedure in the automatic mode.

FIG. 4 describes the switching-on procedure if the control of the power lift device is combined with the power take-off shaft control in an automatic mode. The automatic mode is selected with the switch 12. Thus, it is assumed as starting condition that the engine is running, the power take-off shaft clutch 2 is disengaged, the vehicle is in motion, and the automatic mode is switched on (box 50). If the operator by now issues, for instance by actuating the lever 9 or by actuating the momentary contact switch 11, the instruction to lower the power lift device (box 51), then this instruction will not be followed but the controller 10 causes the adjustment of the engine speed to the lowest required value (box 52) as described in connection with box 32 in FIG. 2.

Only then the controller permits the start of lowering of the power lift device (box 53). In view of the reduced rotational speed, already during the lowering motion of the lift device, the controlled start-up of the power take-off shaft may occur (box 54). This controlled engagement of the power take-off shaft clutch is indicated by the decision rhombus 55. On engagement of the power take-off shaft, generally also the power lift device should have reached its lowered position, box 56. Now the engine speed is again increased to such a value which is required for the selected or standardized rotational speed of the power take-off shaft, box 57. The increase of the rotational speed of the engine is again indicated by the decision rhombus 58. As soon as this rotational speed is reached, the switching-on procedure will be completed (box 59). Therefore, with only one instruction, both the engagement of the power take-off shaft clutch as well as the lowering of the power lift device will be performed in a carefully coordinated manner.

Figure 5:
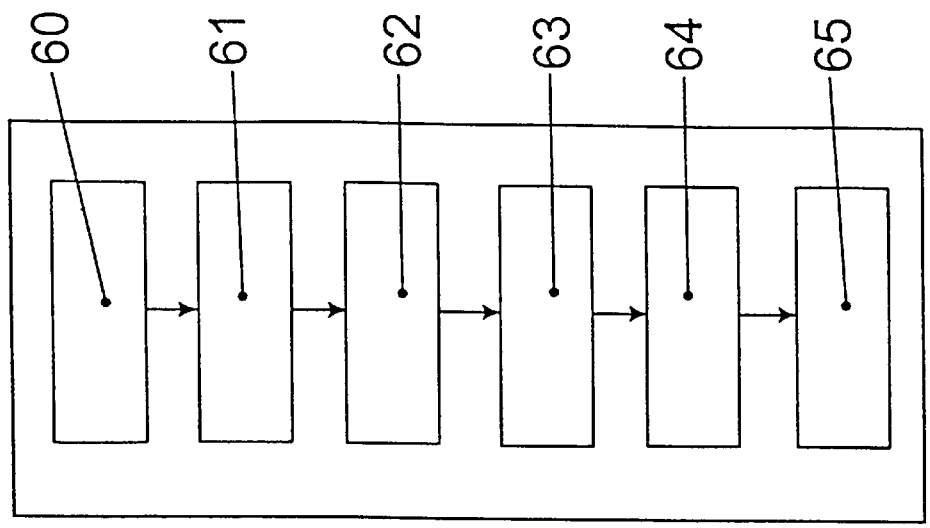
FIG. 5 is a logic flow diagram of the switching-off procedure in the automatic mode.

The switching-off procedure of FIG. 5 starts with a running engine and rotating power take-off shaft in the automatic mode (box 60). This might take place in a stationary condition or at the end of a run of a field on approaching the headlands. By actuating the lever 9 or, preferably with corresponding coupling, by actuating the momentary contact switch 13, the operator issues the instruction for raising the power lift device or for performing the switching-off procedure inclusive the actuation of the power lift device (box 61), respectively. As a first step, the controller 10 issues to the motor regulator 25 the instruction to reduce the rotational speed of the engine, to about the idle speed (box 62). This will result in a reduction of the travelling speed of the vehicle, which is desired before turning. As a next step, the power take-off shaft clutch will be disengaged (box 63), and finally, the power lift device is raised (box 64). The raising of the lift device may overlap in time with the disengagement of the power take-off shaft clutch, and, if the raising of the power lift device is especially slow with heavy machinery, it may start before the engine speed will be fully decreased. In any case, by now the power take-off shaft is disengaged, the power lift device is raised and the travelling speed is reduced (box 65). The vehicle now may be turned, also with reversing, and the next run of the field may be begun, again repeating in box 50 of FIG. 4.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method for controlling the drive mechanism of a utility vehicle having a hydraulic load fed by a constant pressure pump driven by an engine including a pressure sensor configured to said pump, a power take-off shaft, said drive mechanism further including a transmission, a power take-off shaft clutch and a controller, comprising the steps of:

engaging said pressure sensor in a controlled manner to increase the rotational speed of said engine;

if said hydraulic load is switched on, automatically increasing the, rotational speed of said engine;

if said hydraulic load is switched off, automatically decreasing the rotational speed of said engine;

if said engine is operating at a rotational speed greater than a threshold, automatically reducing the rotational speed below said threshold;

engaging said power take-off shaft clutch in a controlled manner at a rotational speed of the engine lower than said threshold;

after complete engagement of said power take-off shaft clutch, increasing the rotational speed of said engine by said controller up to a rotational speed required for a nominal speed of rotation of the power take-off shaft; and automatically decreasing the rotational speed of said engine when said power take-off shaft clutch is subsequently disengaged.

2. The method of claim 1 wherein the step of automatically decreasing the rotational speed of the engine further includes the steps of:

first, automatically decreasing the rotational speed of the engine; and then, disengaging the power take-off shaft clutch.

3. The method of claim 1, wherein the utility vehicle includes a power lift device for an implement driven by the power take-off shaft, further comprising the steps of:

disengaging the power take-off shaft clutch and decreasing the rotational speed of the engine when said controller receives an instruction for raising the power lift device; and subsequently engaging the power take-off shaft clutch in a controlled manner and increasing the rotational speed of the engine when said controller receives an instruction for lowering the power lift device.

4. The method of claim 3 wherein the step of disengaging the power take-off shaft clutch and decreasing the rotational speed of the engine when said controller receives an instruction for raising the power lift device includes the step of:

automatically reducing the rotational speed of the engine, whereupon then the lift device is raised only after the power take-off shaft clutch is disengaged.

5. The method of claim 1, wherein a data bus is supported by said utility vehicle for communicating messages and said hydraulic load is configured to said data bus, further comprising the steps of:

providing a load report of requirements via the data bus; and increasing the rotational speed of said engine to a rotational speed to satisfy the requirements from said load report.

6. The method of claim 5 further comprising the step of:

decreasing the rotational speed of said engine to a threshold determined by said load report in response to failures identified in said load report.

\* \* \* \* \*